(12) United States Patent  
Turcot et al.

(10) Patent No.: US 8,192,112 B2  
(45) Date of Patent: Jun. 5, 2012

(54) UNIVERSAL ROTARY CUTTER HEAD WITH BACK CLAMPING SYSTEM AND CONSTANT CUTTING DIMENSIONS AND CONSTANT WEIGHT REGRIDABLE INSERTS

(75) Inventors: Philippe Turcot, Mont-St-Hilaire (CA); Gabriel Fafard, St-Hubert (CA); Yvon Gauthier, McMasterville (CA); Martin Greendale, St-Jean-sur-Richelieu (CA); Hans Luscher, St. Jean-Baptist (CA)

(73) Assignee: Outils Gladu, S.E.N.C., Marieville (CA)

( * ) Notice: Subject to any disclaimer, the term of this patent is extended or adjusted under 35 U.S.C. 154(b) by 511 days.

(21) Appl. No.: 12/411,686

(22) Filed: Mar. 26, 2009

(65) Prior Publication Data

US 2009/0245947 A1 Oct. 1, 2009

Related U.S. Application Data

(60) Provisional application No. 61/040,296, filed on Mar. 28, 2008, provisional application No. 61/107,477, filed on Oct. 22, 2008.

(51) Int. Cl.  
*B27G 13/00* (2006.01)  
*B27G 13/04* (2006.01)

(52) U.S. Cl. .......................................... 407/30; 407/45  
(58) Field of Classification Search .................. 407/36, 407/37, 38, 41, 45, 66, 67  
See application file for complete search history.

(56) References Cited

U.S. PATENT DOCUMENTS

| | | | | |
|---|---|---|---|---|
| 4,826,090 A | * | 5/1989 | Orphall | 241/191 |
| 5,658,101 A | * | 8/1997 | Hammer | 407/37 |
| 5,716,167 A | * | 2/1998 | Siddle et al. | 407/36 |
| 5,957,176 A | * | 9/1999 | Stein | 144/230 |
| 6,811,362 B2 | * | 11/2004 | Wallin et al. | 409/138 |

FOREIGN PATENT DOCUMENTS

| | | |
|---|---|---|
| EP | 1 033 210 | 9/2000 |
| EP | 1070563 A1 * | 1/2001 |

* cited by examiner

*Primary Examiner* — Will Fridie, Jr.  
(74) *Attorney, Agent, or Firm* — Norton Rose Canada LLP (57) ABSTRACT

A rotary cutting tool has a cutting insert clamped from behind by a backing clamp against a frontal abutment defined in the body of the rotary cutter head. The clamp backs the cutting insert against the cutting pressure during operation and provides for the use of a same rotary cutter with different profiles of cutting inserts. Plugs of predetermined weight can be inserted in pre-formed holes in the cutting insert to permit recalibration of the insert after a sharpening operation.

15 Claims, 8 Drawing Sheets

UNIVERSAL ROTARY CUTTER HEAD WITH BACK CLAMPING SYSTEM AND CONSTANT CUTTING DIMENSIONS AND CONSTANT WEIGHT REGRIDABLE INSERTS

RELATED APPLICATIONS

The present application claims priority on U.S. provisional patent application Nos. 61/040,296 and 61/107,477 respectively filed on Mar. 28, 2008 and Oct. 22, 2008.

TECHNICAL FIELD

The present application generally relates to rotary cutting insert tools and, more particularly, to a system for positioning and holding replaceable cutting inserts on a rotary cutter head. The application is also concerned with a system allowing for indexable cutting inserts to be re-profiled or sharpened without changing the original cutting profile and dimensions of the rotary cutting insert tool while also allowing for maintaining the original weight of the regrindable cutting inserts.

BACKGROUND ART

The conventional manner of positioning a chisel or cutting insert on the insert holder of a rotary cutter, such as a router bit, a milling cutter or a planer head, is by abutting a precision ground surface located on the rear and side edges of the cutting insert against a precision ground backing reference surface provided on the insert holder's body. One of the shortcomings of such a system is that the entire cutting tool must be repositioned relative to the workpiece every time the cutting edge of the profiled insert is sharpened. This is a time consuming process. The adjustment of the overall cutter head position relative to the workpiece compensates for the amount of material removed from the insert's worn edge. This adjustment is effected so that the workpieces being machined are in dimensional tolerance, one to the other from one work cycle to the next.

The re-profiling or sharpening of a cutting insert implies removal of material from the insert and thus it results in a reduction of the weight of the insert. Applicant has found that there is a need to easily recalibrate the weight of a re-profiled insert to its original value after a sharpening or re-profiling operation has been conducted.

The backing surface of the holder body offers resistance against the cutting pressure, which is in a direction opposite the movement of the cutting tool, transferred to the cutting insert during operation. A front clamping member is provided at the front of the cutting insert, relative to the movement of the cutting tool, in order to firmly press the cutting insert against the backing surface of the holder body. One of the shortcomings of such a system is that the backing surface of the insert holder has to be profiled according to the cutting edge profile of the cutting insert. Accordingly, different insert holders must be provided for different profiles of cutting inserts.

It would be advantageous to be able to use the same rotary cutter head for different cutting insert profiles.

SUMMARY

In accordance with a general aspect, there is provided a rotary cutter head comprising a body mounted for rotation about an axis of rotation, at least one pocket defined in a periphery of the body for releasably receiving a cutting insert, said cutting insert having a front surface adapted to be urged against a corresponding frontal abutting surface of said pocket relative to a direction of rotation of said rotary cutter head, and a back clamping member profiled according to a cutting edge profile of the cutting insert and provided at the back of said cutting insert for releasably clamping said cutting insert against said frontal abutting surface, the clamping action of said back clamping member being exerted generally in a forward direction that is in a direction opposite to the cutting pressure transferred to the cutting insert during operation.

In accordance with a further general aspect, there is provided a rotary cutter head having a body mounted for rotation about an axis of rotation, at least one seat defined in a periphery of the body for releasably receiving a cutting insert, a clamping member for releasably clamping the cutting insert in position in said seat, and at least one biasing member urging said cutting insert in an outward direction away from said axis to a locking position wherein at least three bearing surfaces on said cutting inserts abut corresponding abutments on said body.

According to another aspect, a constant diameter profiler can be obtained by urging the cutting insert in an outward direction against the corresponding abutting structure of the body of the rotary cutter head and by regrinding the bearing surfaces of the cutting insert to remove an amount of material therefrom corresponding to the amount of material removed from the cutting edge of the cutting insert when sharpening the cutting insert.

According to a further aspect, there is provided a regrindable cutting insert comprising a body with a reference edge and a cutting edge, and pre-formed holes defined in said body for receiving weightening plugs for compensating for the weight removed from the cutting insert during a re-sharpening operation of the cutting insert.

According to a still further aspect, there is provided a method of recalibrating the weight of an indexable cutting insert after a re-sharpening operation of a cutting edge of the cutting insert, the method comprising: adding a mass to the insert, the mass having a weight greater the weight of material removed from the insert during the re-sharpening operation; and removing material from a non-reference surface of the insert to reduce the mass of the insert back to its original value.

According to a still further aspect, there is provided a method of recalibrating an indexable cutting insert after a re-sharpening operation, the method comprising: inserting at least one plug in a pre-formed hole defined in the cutting insert, the plug having a weight greater than the weight of material removed from the cutting insert during the re-sharpening operation; and removing material from a non-reference surface of the insert to reduce the mass of the insert back to its original value.

According to a still further aspect, there is provided a method of re-sharpening a cutting edge of a cutting insert while maintaining axial, radial and profile dimensions of a rotary cutting tool on which the cutting insert is used, the method comprising: inserting plugs in a first set of pre-formed holes defined in a reference edge of the cutting insert, the plugs providing new reference points shifting the cutting insert further outward from an original cutting diameter of the tool, and sharpening the cutting edge of the cutting insert by removing a corresponding amount of material therefrom, thereby causing the cutting insert to present the same axial, radial and profile dimensions on the rotary cutting tool.

BRIEF DESCRIPTION OF THE DRAWINGS

Reference will now be made to the accompanying drawings in which.

DESCRIPTION OF THE PREFERRED EMBODIMENTS

Referring now to the drawings, a cutting insert tool suited for profiling a workpiece (for instance solid woods, engineered woods, plastics, composites and non-ferrous metals) in accordance with an embodiment of the present invention comprises a rotary cutter head 10 having a cylindrical body 12 adapted to be mounted for rotation about an axis of rotation A. A plurality of circumferentially spaced-apart pockets or seats 14 (two in the illustrated embodiment) are defined in the periphery of the body for removably receiving corresponding cutting inserts 16 (only one of which is being shown in the drawings). Each cutting insert 16 is releasably secured in its associated seat 14 by means of a clamping system 18 including a back clamping member 20 and a single clamping screw 22 adapted to be threadably engaged with the cutter head body 12.

Figure 3:
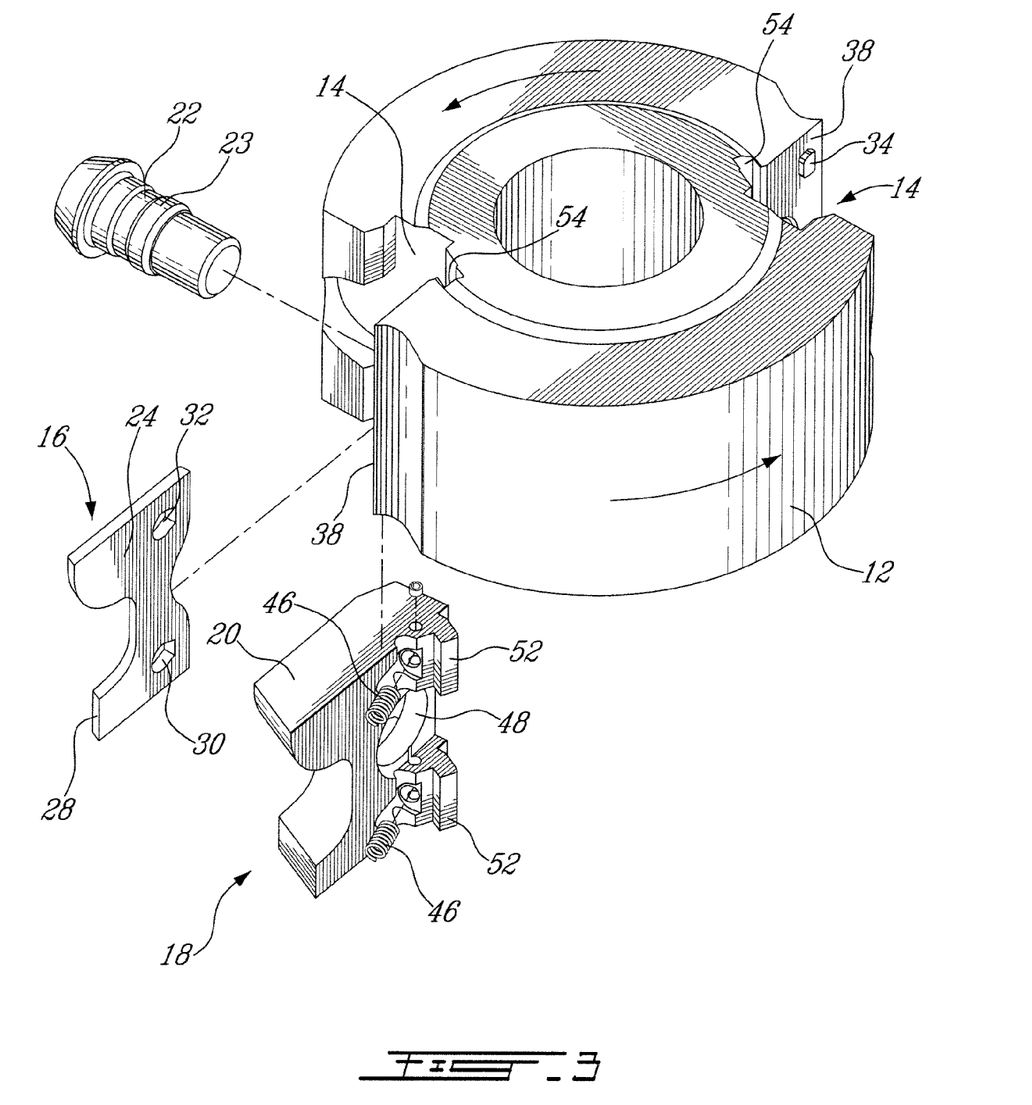
FIG. 3 is an exploded view of the rotary cutter head shown in FIG. 1.
Figure 4:
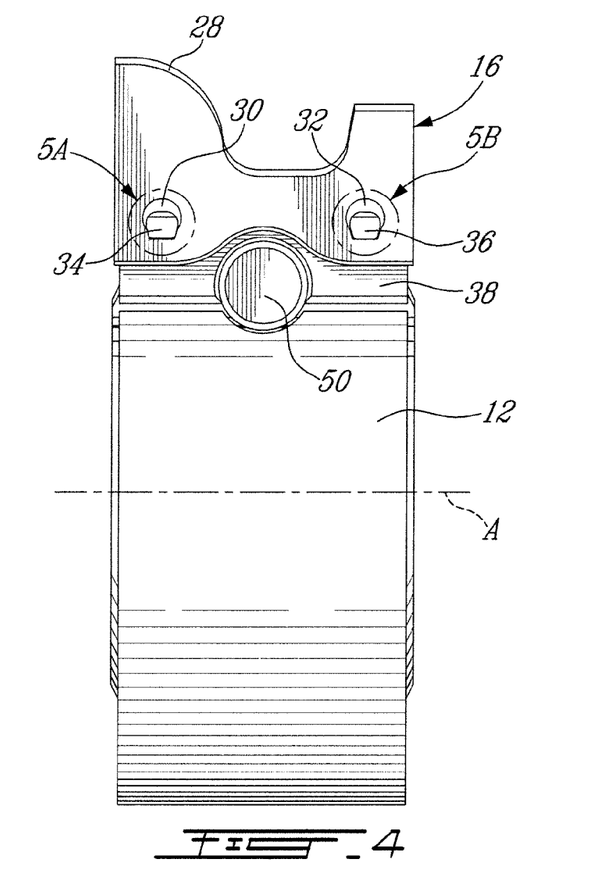
FIG. 4 is a back plan view of the rotary cutter, the back clamping system being omitted to illustrate the engagement of one cutting insert on a pair of positioning pegs provided on the body of the cutter head.

The cutting insert 16 is preferably made of rigid carbide or any other materials suited for cutting operations. The cutting insert could for instant have a sheet-like or planar carbide body tipped with a poly-crystalline diamond at the cutting edge. As best shown in FIG. 3, the insert 12 can be provided in the form of a plate having opposite planar front and back surfaces 24 and 26. A cutting edge 28 of a desired profile is provided at an upper or outer end of the insert 12 and extends between opposed side edges of the insert 12 for engaging the workpiece and cut the same. First and second laterally spaced-apart locating holes 30 and 32 are defined on an axis in the cutting insert 16 at an inner or lower end portion thereof for engagement with positioning pins or pegs 34 and 36 projecting from a front planar abutting surface 38 of each seat 14 in the cutter head body 12. This is best shown in FIG. 4. The pegs 34 and 36 can be integrally machined in the front abutting surface 38 or separately mounted thereto.

Figure 5A:
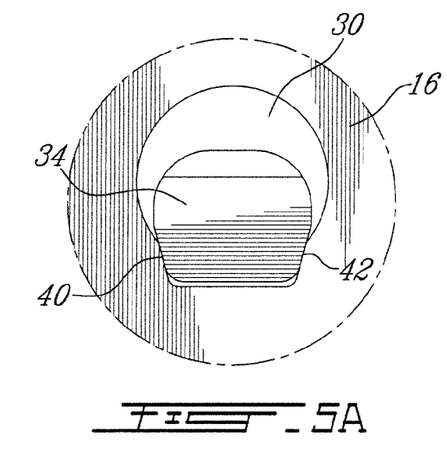
FIGS. 5a and 5b illustrate the bearing points between the cutting insert and the positioning pegs shown in FIG. 4.
Figure 5B:
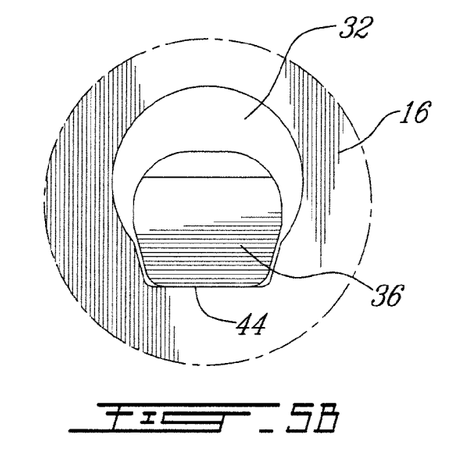

Referring now to FIGS. 5a and 5b, it can be seen that the first and second locating holes 30 and 32 have an oversized semi-circular like entry portion for facilitating positioning of the insert 16 on the pegs 34 and 36 and a bottom polygonal locking portion to respectively provide a two-point bearing and a single-point bearing with the first and second pegs 34 and 36. According to the illustrated embodiment, the polygonal portion of the first and second holes 30 and 32 have a similar trapezoidal-like profile, including two opposed converging sides and a small planar base. Other geometry could be used as well provided that at least three bearing points are created between the pegs 34 and 36 and the holes 30 and 32.

As shown in FIG. 5a, the first peg 34 has also a trapezoidal base portion adapted to be received in a wedge-like fashion in the trapezoidal portion of the first hole 30 to abut against two points 40 and 42 on opposed sides of the first hole 30, thereby arresting or locking the cutting insert 16 against lateral movement in the seat 14 along an axis parallel to the rotation axis A of the tool. As shown in FIG. 5b, the second peg 36 and the second hole 32 are configured for providing one point of contact 44 between the small base surface of the trapezoidal portion of the second hole 32 and the undersurface of the second peg 36, thereby locking the insert 16 against centrifugal dislodgement when the rotary head 10 is driven in rotation.

As shown in FIG. 3, a pair of compression springs 46 are received in corresponding seats defined in the back clamping member 20 in order to automatically self-position the cutting insert 16 in bearing engagement with the first and second positioning pegs 34 and 36, as shown in FIGS. 5a and 5b. Unlike conventional positioning systems, the springs 46 bias the cutting insert 16 in an outward direction that is in a direction away from the center or rotation axis of the cutter head 10. Accordingly, whenever the cutting edge 28 of the cutting insert needs to be re-sharpened, the bearing surfaces or peg engaging surfaces of the first and second positioning holes 30 and 32 of the insert can be re-ground in such a way as to compensate for the material that has been removed from the cutting edge 28, thereby providing for a constant diameter profiler. The cutter head 10 does not have to be re-positioned in relation to the workpiece since the removal of material from the insert positioning holes 30 and 32 compensates for the removal of material from the worn cutting edge 28. In other words, the positioning of the cutting edge 28 relative to the positioning pegs 34 and 36 remains constant, thereby providing for the production of parts of uniform profile without having to re-adjust the position of the cutter head 10 after every subsequent sharpening operation of the cutting inserts 16.

Figure 7A:
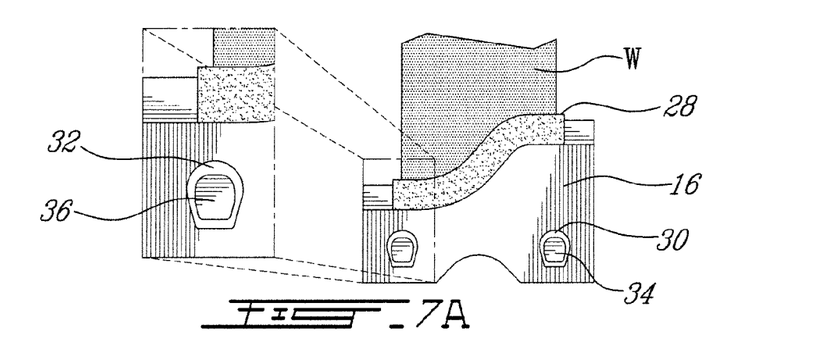
FIGS. 7a to 7d are schematic views illustrating a re-profiling process of a cutting insert to provide for a constant profile and dimensions rotary cutting tool.
Figure 7B:
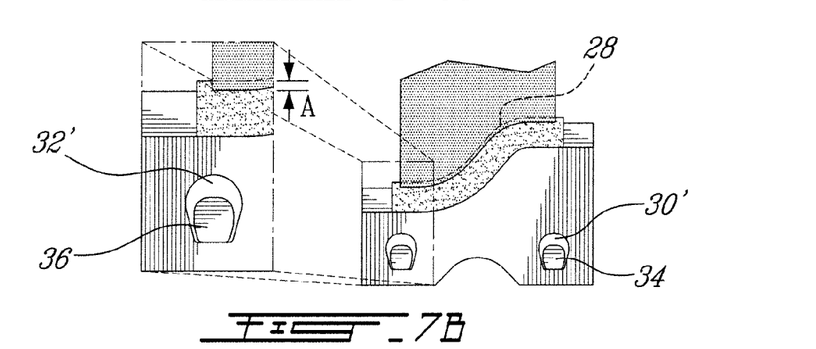
Figure 7C:
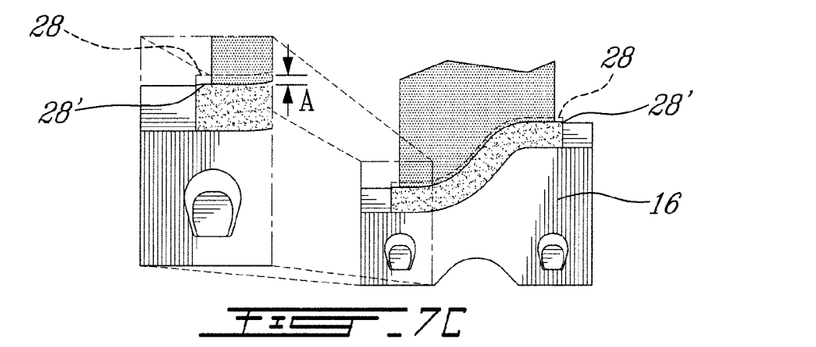
Figure 7D:
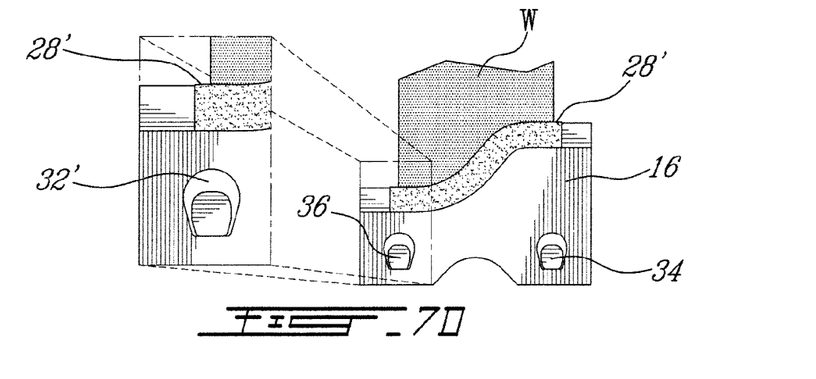

The above constant cutting diameter re-profiling process is detailed in FIGS. 7a to 7d. As shown in FIG. 7a, the first step consists of enlarging the locating holes 30 and 32 so as to cause the cutting insert 16 to project further outward by a distance A from the cutter head circumference when pushed outwardly in position against the positioning pegs 34 and 36. The insert 16 is then positioned back on the cutter head with the freshly enlarged holes 30' and 32', as shown in FIG. 7b. As mentioned above, this results in the cutting diameter being slightly greater than the original cutting diameter of the tool by a distance A. The cutting edge 28 of the insert 16 is then sharpened in relation to the locating holes 30 and 32. More particularly, as shown in FIG. 7c, a thickness of material A corresponding to the distance between the original cutting diameter and the cutting diameter of the tool once the locating holes 30 and 32 have been enlarged (i.e. distance A in FIG. 7b) is removed from the profiled cutting edge 28 to bring the tool cutting diameter back to the original specification. This operation can be performed with the insert 16 in position on the cutter head 10. As can be appreciated from FIG. 7d, the re-profiled cutting edge 28' has thus the same position relative to the workpiece W and the tool original cutting diameter. No fence or spindle adjustments on the cutting machine are required after installing a new or re-sharpened inserts. The material removed from the reference or locating holes to form new reference or contact points together with the material removed from the cutting edge is sufficient to provide unchanged axial, radial and profile dimensions relative to the original profile.

Figure 8A:
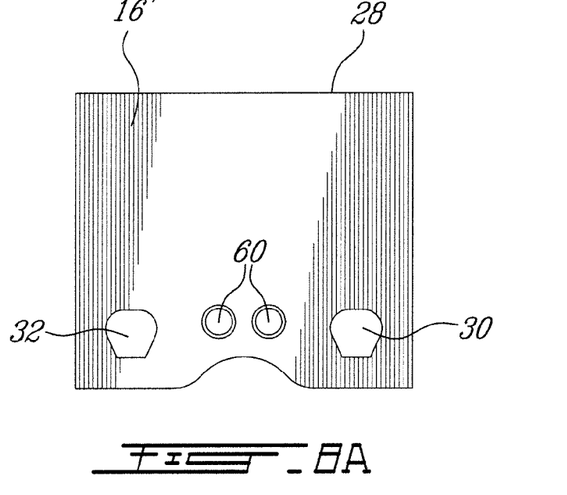
FIGS. 8a and 8b are respectively front and side views of an embodiment of a cutting insert having pre-formed holes for receiving weightening plugs that can be used to obtain constant weight regridable inserts.
Figure 8B:
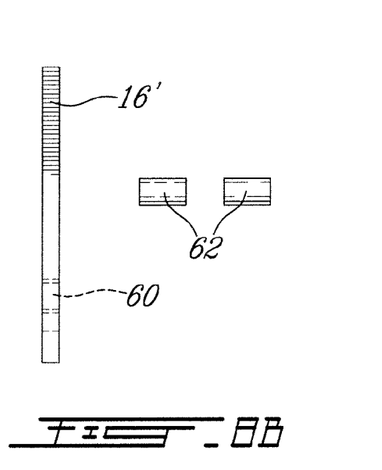

To rebalance the weight of the insert 16 after re-profiling, material may be added to the insert 16. As shown in FIGS. 8a and 8b, this could, for instance, be accomplished by inserting weightening plugs 62 into pre-formed holes 60 (two in the illustrated embodiment) defined through the insert 16. The plugs 62 could be provided in the form of soft metal (e.g. copper, brass, etc.) cylinders of predetermined weight. Other suitable ductile materials could be used as well. The holes 60 can be shaped with a bevel at each end thereof. The volume of the holes 60 is selected to be slightly greater than the volume of the plugs 62 such that after being punched or pressed in respective holes 60, the plugs 62 are fully contained in the holes 60. The plugs 62 are slightly smaller than the holes 60 in diameter but slightly greater in length than the depth of the holes 60 in order to provide for easy insertion of the plugs 62 in the holes 60 while providing sufficient plug material to spread out in the beveled ends of the holes 60 under the pressure exerted by the punch or press used to secure the plugs 62 in the holes 60. This provides for a rivet-like fixation of the plugs 62 in the holes 60. The deformation of the plug ends in the beveled ends of the holes 60 prevents physical separation of the plugs 62 from the insert 16.

The weight of the plugs 62 is selected to be slightly greater than the weight of material removed from the cutting insert 16 during the re-profiling or sharpening operation. In this way, each insert 16 can be calibrated back to its original weight by removing material from a non-reference surface or edge of the plugged insert. For instance, the re-profiling of a 25 grams insert may result in the removal of 0.2 gram of material from the cutting insert 16. Accordingly, after the re-profiling operation, the insert weights 24.8 grams. Then, a 0.3 gram plug can be added to the insert to provide a 25.1 grams insert. The extra 0.1 gram can then be easily and precisely removed by grinding a non-reference surface or edge (i.e. a surface that is not used to position the insert relative to the cutter head) of the insert. This procedure is preferred because it is generally easier to precisely remove a given quantity of material from an object than to precisely add that same quantity of material.

Unlike conventional insert clamping system, the cutting insert 16 is pressed against the front abutting surface 38 defined in the cutter head body 12 by clamping member 20 located at the back of the cutting insert 16 relative to a direction of rotation of the rotary cutter head 10. As can be appreciated from FIGS. 1, 2 and 3, the back clamping member 20 is profiled according to the cutting edge profile of the cutting insert 16. It is the clamping member that backs the cutting insert 16 against the cutting pressure and not the cutter head body 12 as it is the case in conventional cutting insert clamping arrangements. Accordingly, the cutter head body 12 does not have to be profiled in accordance with the profile of the cutting insert. It therefore becomes possible to use the same cutter head body for different profiles of cutting inserts. The operator has solely to replace the clamping member 20 by a new clamping member corresponding to the new profiled cutting insert. This new arrangement also allows the cutter head to carry a greater number of cutting inserts.

The clamping force is applied in a forward direction (i.e. in a direction opposite to the cutting pressure transferred to the cutting insert during operation) by simply tightening the clamping screw 22 from behind the insert into body 12. As shown in FIG. 3, a through bore 48 is defined in the clamping member 20 for receiving the shank portion of the screw 22. A shoulder 23 tolerances in accordance with the dimensions of the through bore 48 is provided on the shank of the screw 22 to automatically laterally center the back clamping member 20 relative to the insert 16 positioned on the pegs 34. The outer diameter of the shoulder 23 is designed to be just slightly less than the diameter of the bore 48, thereby provide a tight shank-bore tolerance. As shown in FIGS. 3 and 4, the lower end of the cutting insert 16 is also profiled so as to provide the required clearance for allowing the shank of the screw 22 to pass through into the threaded hole 50 (FIG. 2) defined in the front abutting surface 38 of body 12. Once tighten, the head of the screw abuts against a back surface of the clamping member 20.

Figure 1:
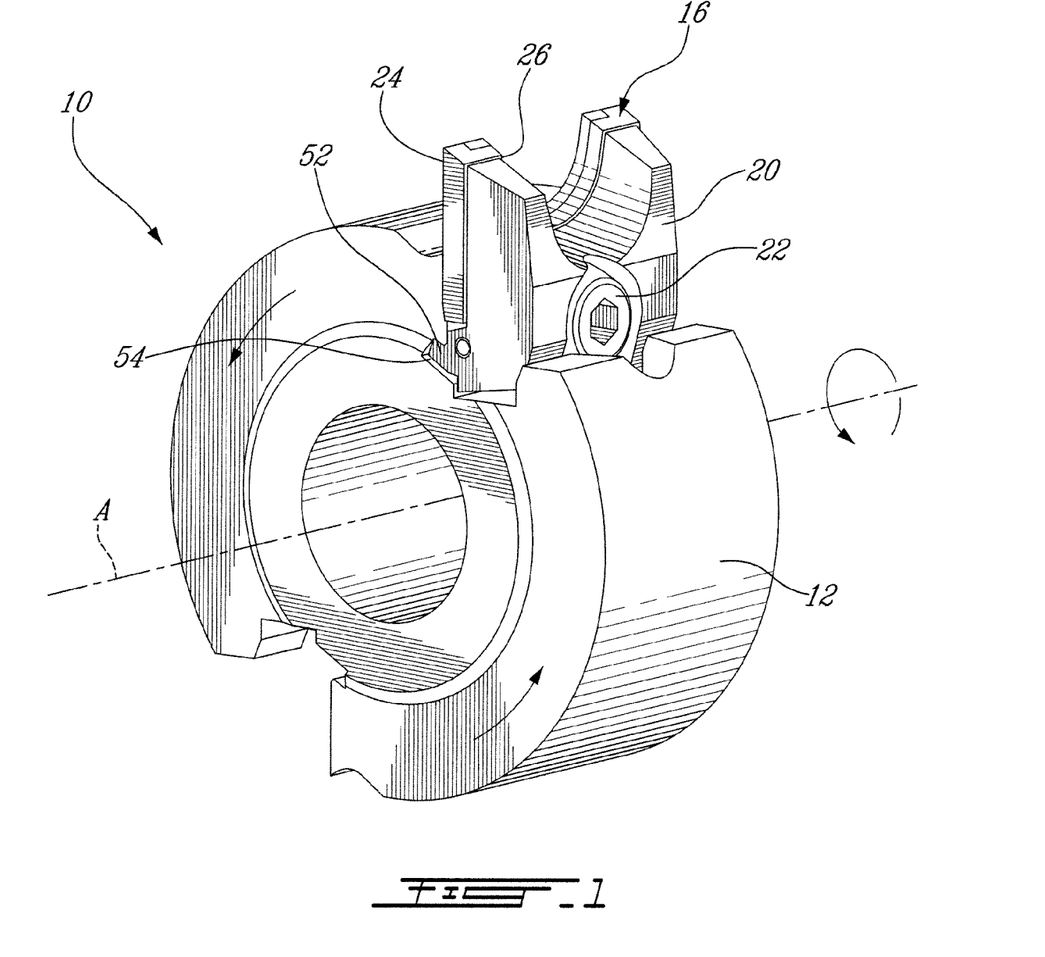
FIG. 1 is a back perspective view of a cylindrical rotary cutter head with a back clamping system in accordance with an embodiment of the present invention.
Figure 2:
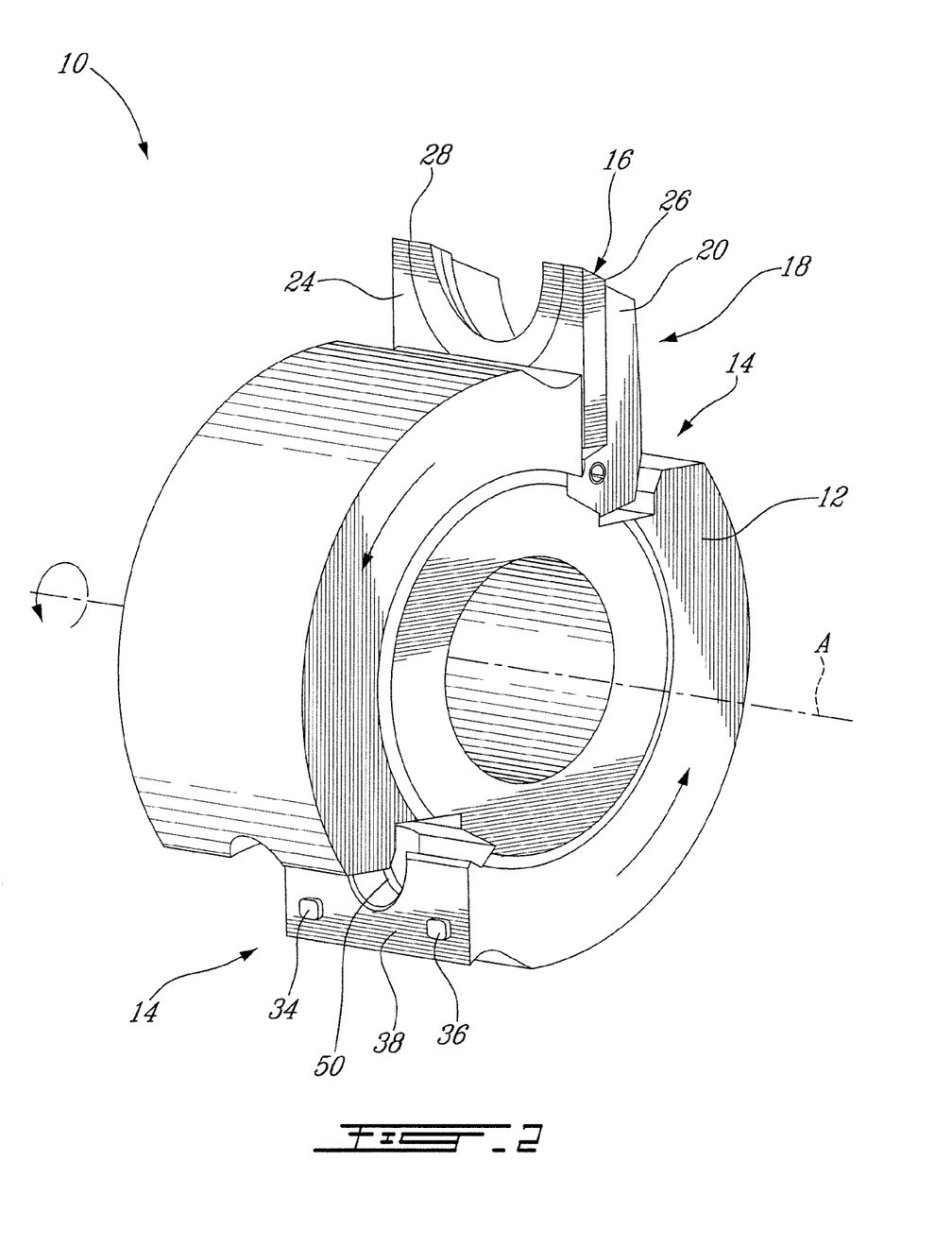
FIG. 2 is a front perspective view of the rotary cutter head shown in FIG. 1.
Figure 6A:
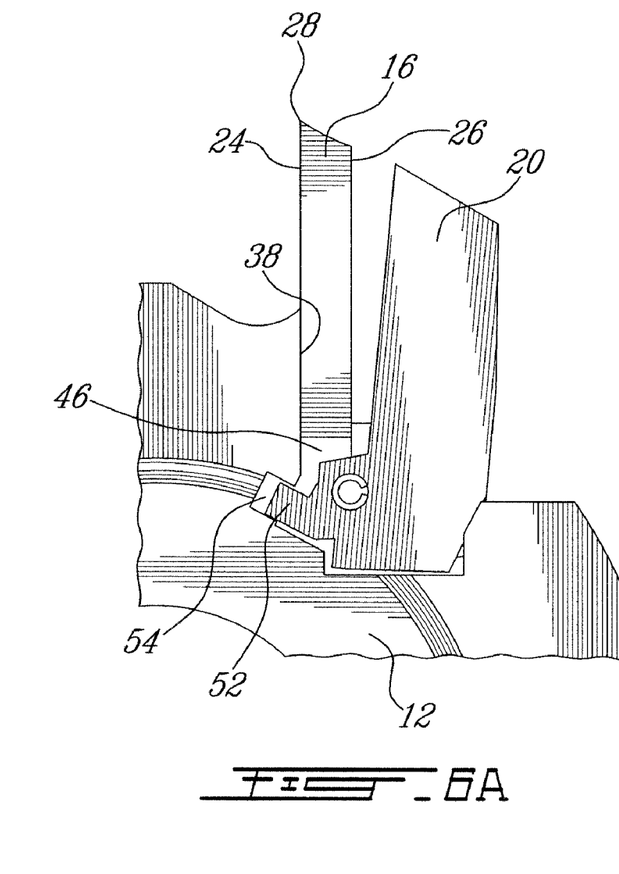
FIGS. 6a and 6b are side views illustrating the positioning and clamping of one cutting insert in a pocket defined in the body of the cutter head.
Figure 6B:
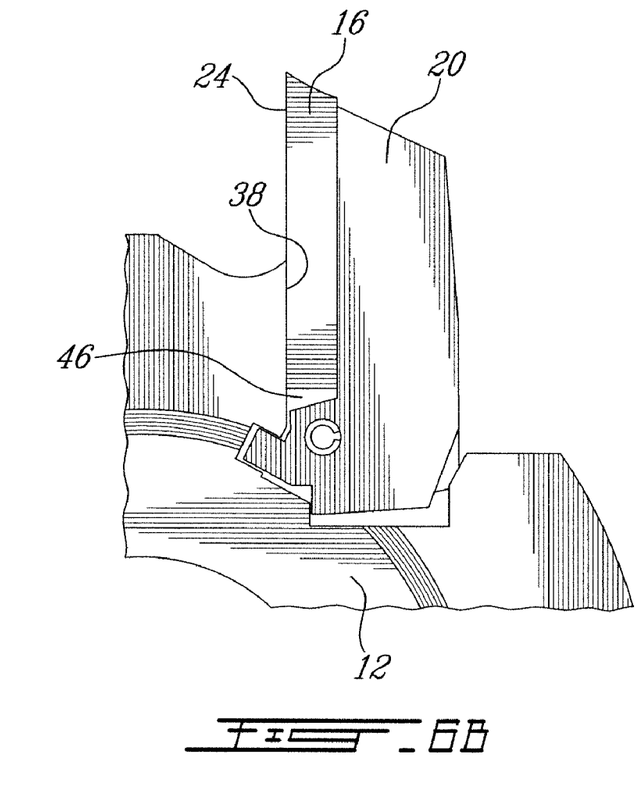

As shown in FIGS. 1, 3 and 6a, clamping member 20 is provided at a lower end or radially inner end thereof with rocking structure that can be provided in the form of a pair of forwardly projecting rocking fingers 52 received in a corresponding groove 54 defined in the body 12. The fingers 52 are used to pre-position and retain the clamping member 20 in the seat 14 and thereby facilitate lowering of the cutting insert 16 onto the springs 46 in engagement with the pegs 34 and 36 as shown in FIG. 6a. Once the cutting insert has been so installed in the seat 14, the screw 22 can be tighten to cause the clamping member 20 to tilt forward into uniform pressing contact with the back surface 26 of the cutting insert 16, as shown in FIG. 6b. As the screw 22 is tighten, the cutting insert 16 is further brought into abutment against the pegs 34 and 36 by the springs 46. This provide for easy and rapid installation of the insert 16 onto the cutter head body 12.

When the insert 16 requires a subsequent sharpening, the clamping screw 22 is loosened and the insert 16 is removed from body 12. The contour of the localization holes 30 and 32; including the three abutment surfaces of the holes 30 and 32 are ground so as to remove therefrom a given thickness of material. The insert 16 is then reinstalled on the rotary cutter head 10 and a corresponding thickness of material is removed from the cutting edge of the insert 16. Plugs 62 can also be pressed in and locked by deformation in the pre-finished holes 60, and the portion of the weight of the resulting plugged insert exceeding the original weight of the insert can be removed by grinding a corresponding amount of material from a non-reference surface of the insert.

Figure 9A:
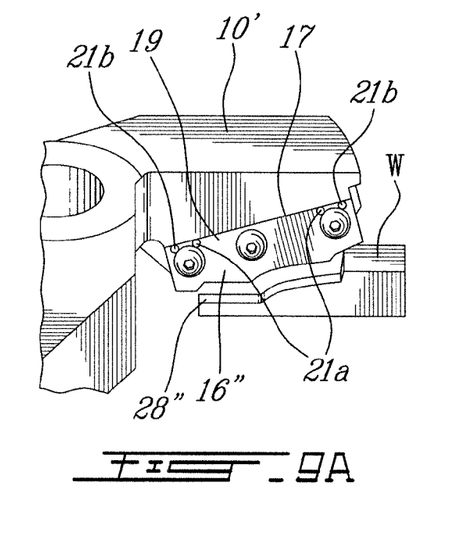
FIGS. 9a to 9c are isometric views illustrating a regrindable cutting insert having preformed semi-circular holes defined in a reference edge thereof for receiving weightening and repositioning plugs that can be used to provide both a constant weight regrindable insert and a constant dimension cutting insert tool.
Figure 9B:
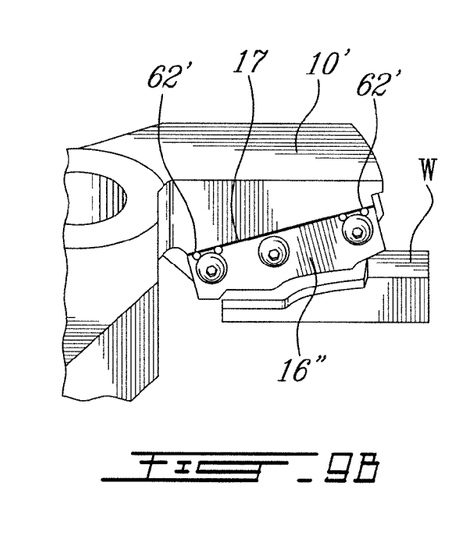
Figure 9C:
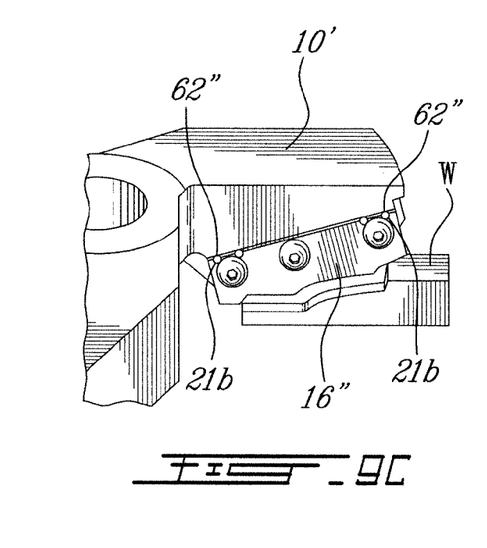

Also, as can be appreciated from FIGS. 9a to 9c, the plugs 62 could be used not only to balance the weight of regrindable inserts 16" but also to reposition the inserts 16" on a cutter head 10' so as to maintain axial, radial and profile dimensions without having to recalibrate or adjust the position of the cutter head 10' relative to the workpiece W to be profiled or cut. In this particular case, the plugs 62 thus have a dual function: 1) weight calibration and 2) position compensation for the material removed from the cutting edge of the insert 16".

More particularly, as shown in FIG. 9a, the insert 16" has a reference edge adapted to be abutted in uniform bearing contact against a corresponding reference surface 19 on the cutter head 10'. At least one set of semi-circular pre-formed holes 21 (two pairs 21a and 21b in the illustrated embodiment) are defined along the reference edge 17 opposite to the cutting edge 28".

As shown in FIG. 9b, cylindrical plugs 62' can be inserted and fixed in the first pair of pre-formed semi-circular holes 21a to create two new points of reference projecting outwardly from the original reference edge 17 by a distance corresponding to the radius of the plugs 62'. The radius of the plugs 62' is slightly less than the radius of the semi-circular holes 21b to permit insert of the plugs in the holes. After the plugs 62' have been inserted and secured in the first pair of semi-circular holes 21a, the insert 16" can be reinstalled on the cutter head 10' with the cylindrical plugs 62' now bearing against the reference surface 19 of the cutter head 10'. This cause the cutting edge 28" to project further outward from the cutter head body by a distance corresponding to the radius of the plugs 62'. A corresponding amount of material can then be removed from the cutting edge 28" to cause the sharpened insert to present the same cutting diameter, the same axial dimension and the same profile as the original insert shown in FIG. 9a.

As the weight of the material removed from the insert during the re-sharpening operation is less than the weight added to the reference edge (i.e. the weight of the plugs), the insert can be conveniently rebalanced by removing material from a non-reference surface or edge of the insert such as to preserve the original weight of the insert, as per the way described hereinbefore in connection with FIGS. 8a and 8b.

A shown in FIG. 9c, additional plugs 62" having a larger radius than the first set of plugs 62' can be inserted in a second pair of larger semi-circular holes 21b to permit a second re-sharpening operation of the insert 16" without having to re-adjust the position of the cutter head 10' relative to the work piece W. The second set of plugs 62" and the second set of semi-circular holes 21b could, for instance, have a radius of about 0.04 inch while the first set of plugs 62' and the first pair of semi-circular holes 21a could have a radius of 0.002 inch. In this way, the insertion of the second set of plugs 62" in the second set of semi-circular holes 21b creates two new reference points which shift the cutting edge further outward from the cutter head body. This permit the cutting edge to be re-sharpened a second time, as per the way described above.

The plugs 62' and 62" can be secured in the pre-formed semi-circular holes 21a and 21b as per the way described above with respect to the weightening plugs 62 shown in FIGS. 8a and 8b. Other securing methods are contemplated as well.

The above description is meant to be exemplary only, and one skilled in the art will recognize that changes may be made to the embodiments described without departing from the scope of the invention disclosed. For example, springs could be substituted by another type of biasing members adapted to pre-load the cutting insert outwardly relative to the center of the cutting tool. Also, the biasing members could be otherwise positioned. The first and second holes 30 and 32 do not have to fully extend thickness wise through the cutting insert 16. They could be provided in the form of recesses. Still other modifications which fall within the scope of the present invention will be apparent to those skilled in the art, in light of a review of this disclosure, and such modifications are intended to fall within the appended claims.

What is claimed is:

1. A rotary cutter head comprising a body mounted for rotation about an axis of rotation, at least one pocket defined in a periphery of the body for releasably receiving a cutting insert, said cutting insert having a front surface adapted to be urged against a corresponding frontal abutting surface of said pocket relative to a direction of rotation of said rotary cutter head, and a back clamping member profiled according to a cutting edge profile of the cutting insert and provided at the back of said cutting insert for releasably clamping said cutting insert against said frontal abutting surface, the clamping action of said back clamping member being exerted generally in a forward direction that is in a direction opposite to the cutting pressure transferred to the cutting insert during operation, and further comprising at least one biasing member urging said cutting insert in an outward direction away from the axis of rotation against an abutment structure provided on said frontal abutting surface.

2. The rotary cutter head defined in claim 1, wherein said back clamping member defines a hole for receiving a tightening screw threadably engaged in a threaded hole defined in said frontal abutting surface, said screw having a head abutting against a back surface of said back clamping member.

3. The rotary cutter head defined in claim 1, wherein said at least one biasing member is seated in a seat defined in a radially inner end portion of the back clamping member.

4. The rotary cutter head defined in claim 1, wherein said back clamping finger is provided at a radially inner end portion with a forwardly projecting rocking structure for engagement with a corresponding groove defined in the frontal abutting surface of the body.

5. The rotary cutter head defined in claim 1, wherein the cutting insert is seated on a pair of biasing members mounted to a radially inner end portion of the back clamping member.

6. The rotary cutter head defined in claim 5, wherein a pair of projections extends from the frontal abutment surface of the body for engagement in corresponding holes defined in the cutting insert, the biasing members urging said cutting insert against said projections.

7. A regrindable cutting insert comprising a body with a reference edge and a cutting edge, pre-formed holes defined in said body, and weightening plugs insertable in said pre-formed holes for compensating for the weight removed from the cutting insert during a re-sharpening operation of the cutting insert.

8. The regrindable cutting insert defined in claim 7, wherein the pre-formed holes are defined in said reference edge.

9. The regrindable cutting insert defined in claim 8, wherein said pre-formed holes are shaped and sized to allow the weightening plugs to project outwardly from the reference edge in order to form new reference points.

10. The regrindable cutting insert defined in claim 8, wherein said pre-formed holes comprises at least two sets of holes of different dimensions for receiving weightening plugs of correspondingly different dimensions.

11. A method of recalibrating the weight of an indexable cutting insert after a re-sharpening operation of a cutting edge of the cutting insert, the method comprising:
    adding a mass to the insert, the mass having a weight greater the weight of material removed from the cutting insert during the re-sharpening operation; and
    removing material from a non-reference surface of the cutting insert to reduce the mass of the cutting insert back to its original value.

12. The method defined in claim 11, wherein the step of adding a mass to the cutting insert comprises inserting a plug into a pre-formed hole defined in cutting insert.

13. A method of re-sharpening a cutting edge of a cutting insert while maintaining axial, radial and profile dimensions of a rotary cutting tool on which the cutting insert is used, the method comprising:
    inserting plugs in a first set of pre-formed holes defined in a reference edge of the cutting insert, the plugs providing new reference points shifting the cutting insert further outward from an original cutting diameter of the tool, and
    sharpening the cutting edge of the cutting insert by removing a corresponding amount of material therefrom, thereby causing the cutting insert to present the same axial, radial and profile dimensions on the rotary cutting tool.

14. The method defined in claim 13, further comprising recalibrating the weight of the cutting insert, the recalibration including selecting the plugs such that a total weight of the plugged cutting insert after the sharpening operation be greater than an original weight of the cutting insert, and then removing material from a non-reference surface of the insert to bring back the total weight of the plugged cutting insert to the original weight of the cutting insert.

15. A rotary cutter head comprising a body mounted for rotation about an axis of rotation, at least one pocket defined in a periphery of the body for releasably receiving a cutting insert, said cutting insert having a front surface adapted to be urged against a corresponding frontal abutting surface of said pocket relative to a direction of rotation of said rotary cutter head, and a back clamping member profiled according to a cutting edge profile of the cutting insert and provided at the back of said cutting insert for releasably clamping said cutting insert against said frontal abutting surface, the clamping action of said back clamping member being exerted generally in a forward direction that is in a direction opposite to the cutting pressure transferred to the cutting insert during operation, and wherein said back clamping member defines a hole for receiving a tightening screw threadably engaged in a threaded hole defined in said frontal abutting surface, said screw having a head abutting against a back surface of said back clamping member.

* * * * *